United States Patent [19]

Dubois et al.

[11] Patent Number: 4,894,263
[45] Date of Patent: Jan. 16, 1990

[54] MESOMORPHIC POLYMER MATERIAL USABLE IN NON LINEAR OPTICS

[75] Inventors: Jean C. Dubois, Remy les Chevreuses; Gilles Ravaux, Les Ulis; Pierre Le Barny, Orsay, all of France

[73] Assignee: Thomson-CSF, Paris, France

[21] Appl. No.: 265,337

[22] Filed: Oct. 24, 1988

Related U.S. Application Data

[63] Continuation of Ser. No. 37,729, Apr. 13, 1987.

[30] Foreign Application Priority Data

Apr. 15, 1986 [FR] France ................................. 86 05362

[51] Int. Cl.$^4$ ...................... C09K 19/00; C08F 220/36
[52] U.S. Cl. .................................... 428/1; 252/299.01; 252/582; 252/589; 350/350 R; 525/329.7; 525/330.3; 525/330.5; 526/243; 526/292.1; 526/298; 526/311; 526/313
[58] Field of Search .............. 428/1; 525/330.3, 329.7, 525/330.5; 528/10, 26, 28; 526/243, 298, 292.1, 311, 313

[56] References Cited

U.S. PATENT DOCUMENTS 4,631,328 12/1986 Ringsdorf ............................ 526/259
4,657,694 9/1987 Heeger ........................... 252/299.01
4,810,338 3/1989 DeMartino ..................... 204/157.88

FOREIGN PATENT DOCUMENTS 60335 9/1982 European Pat. Off. .
140133 5/1985 European Pat. Off. .
172450 2/1986 European Pat. Off. .
3009235 4/1982 Fed. Rep. of Germany .

OTHER PUBLICATIONS

European Search Report No. FA 379 874 dated Dec. 15, 1986.

Primary Examiner—Christopher Henderson
Attorney, Agent, or Firm—Oblon, Spivak, McClelland, Maier & Neustadt

[57] ABSTRACT

The invention relates to polymeric materials usable in non linear optics. The structure of the material of the invention includes a skeleton to which side chains are attached, the material resulting from the association of a first and a second monomer, the first monomer including a mesomorphogenic group connected to the skeleton by a spacer, the second monomer including a group capable of generating the second harmonic of an electromagnetic wave and also being connected to the skeleton by a spacer.

10 Claims, 4 Drawing Sheets

FIG_1
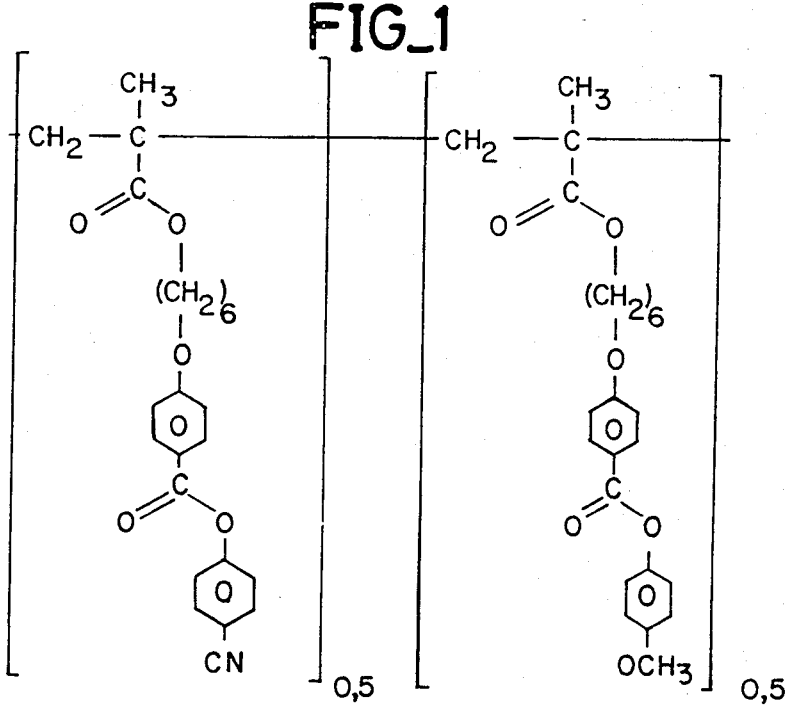
FIG_2
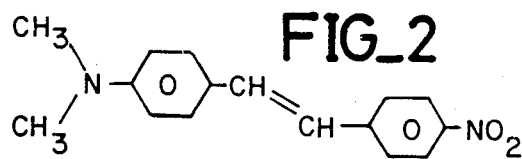
FIG_3
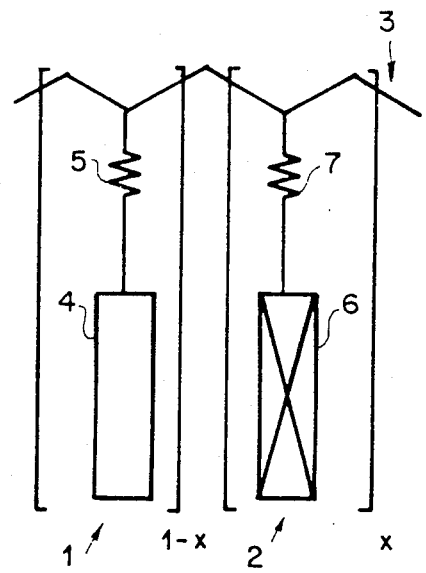

FIG_4
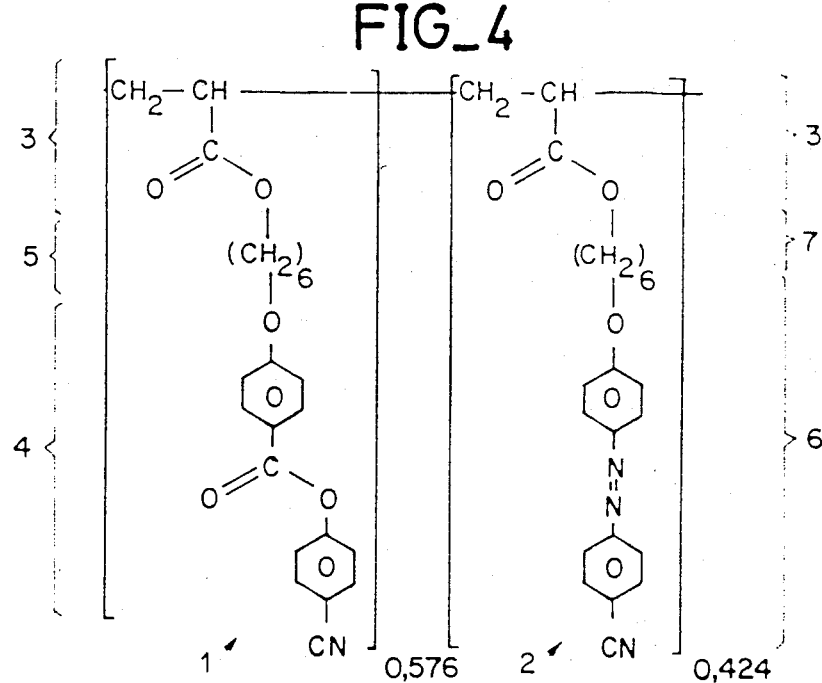
FIG_5
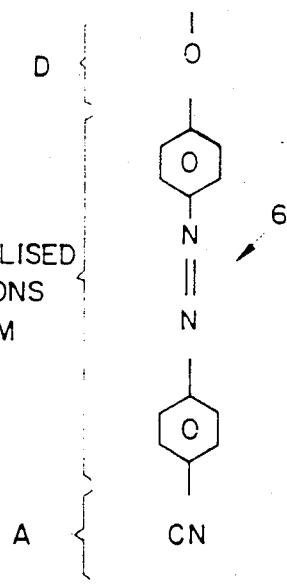
NON-LOCALISED π ELECTRONS SYSTEM

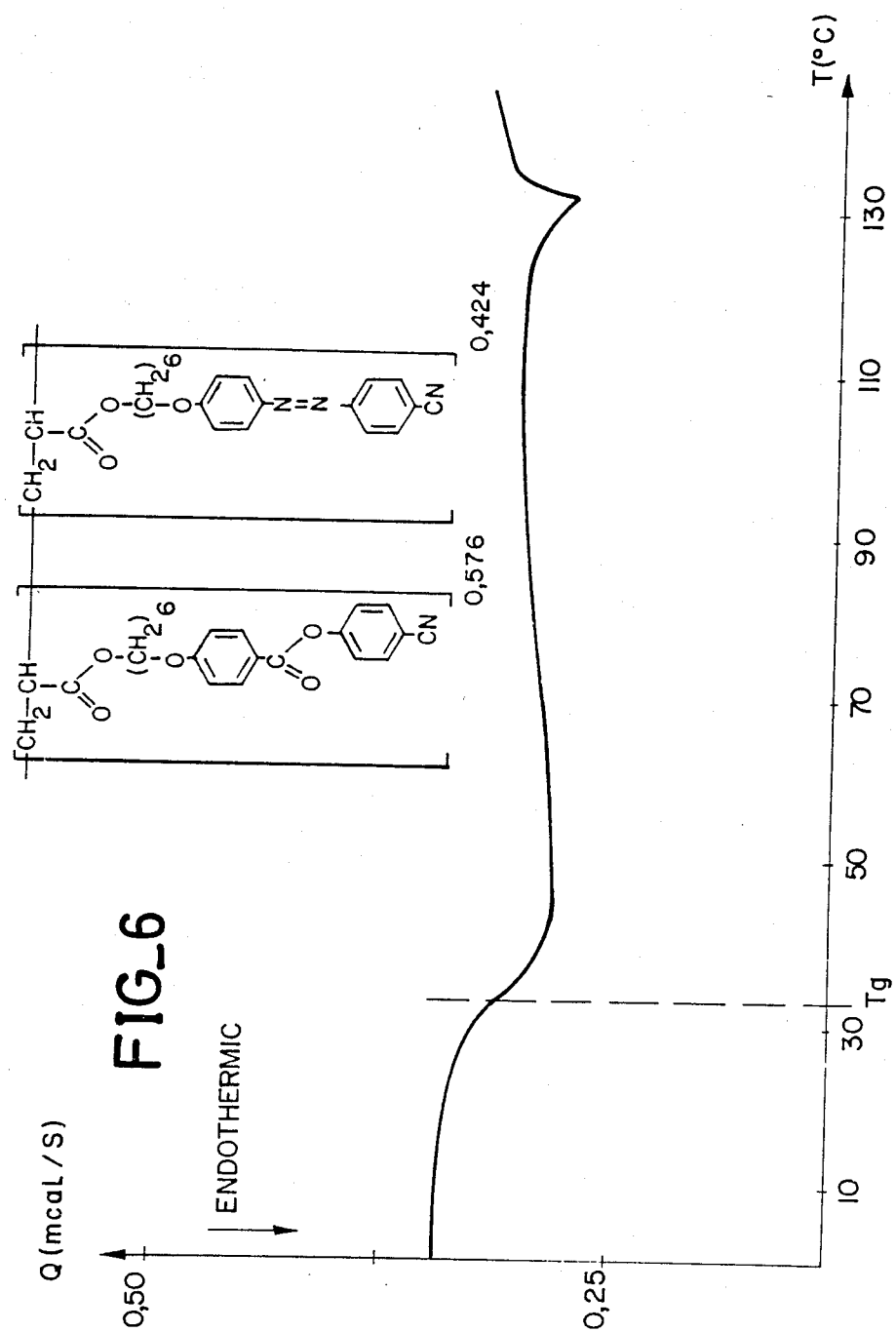
FIG_6

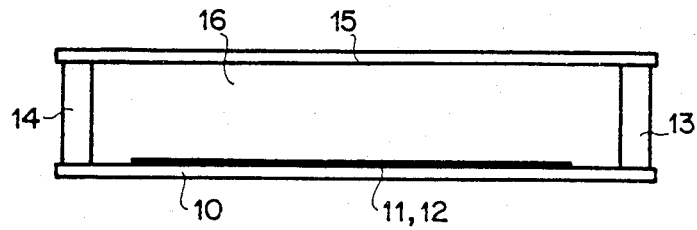
FIG_7
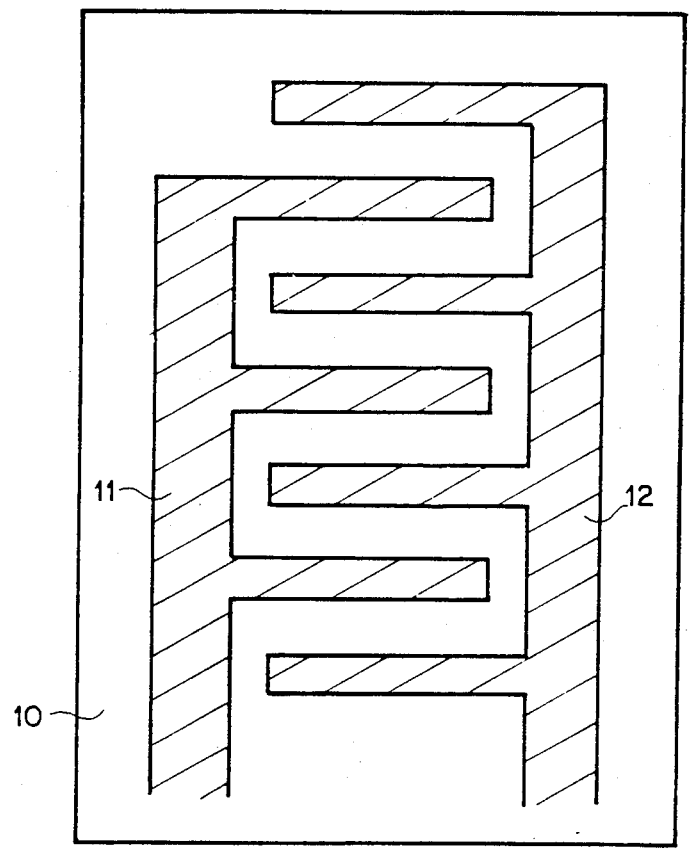
FIG_8

MESOMORPHIC POLYMER MATERIAL USABLE IN NON LINEAR OPTICS

This application is a continuation of application Ser. No. 037,729, filed on Apr. 13, 1987, now abandoned.

BACKGROUND OF THE INVENTION

1. Field of the Invention

The present invention relates to polymeric materials usable in non linear optics. More precisely, it relates to a new type of material which, once suitably oriented, is capable of generating with high efficiency the second harmonic of an electromagnetic wave whose wave length may be between 300 nm and 2000 nm.

2. Description of the Prior Art

At the present time, the most widely used materials for obtaining the second harmonic generation phenomenon, that is to say for obtaining a wave of pulsation $2\omega$ from a wave of pulsation $\omega$, are monocrystal minerals such as lithium niobate or lithium dihydrogenophosphate.

It is only about ten years or so ago that it was realised that organic materials could lead to very intense non linear phenomena, very often greater than those obtained with mineral products.

Organic materials in second harmonic generation have the characteristic of a very great dissymmetry of electronic density on the molecular scale. This is the case for example of 4N dimethylamino-4'-nitrostilbene (DANS). But so that the compound gives rise to the second harmonic generation phenomenon, the molecular arrangement must in addition keep on the macroscopic scale the electronic density dissymmetry which exists on the molecular scale. To satisfy this condition, it is necessary to obtain non centrosymmetric monocrystals. However, the rate of success in obtaining such crystals is only 20% with non chiral compounds. In fact, the molecules such as the DANS have a high permanent dipolar moment and pair up in a head to tail arrangement, which leads to a cestrosymmetric system.

The center of symmetry may be eliminated in a monocrystal formed from molecules having a high hyperpolarizability but pairing up head to tail by dissolving it in a nematic polymer matrix with side chains. This has been described by G. R. Meredith, J. G. Van Dusen and D. J. Williams in the review Macromolecules, 1982, vol. 15, pp 1385-1389. The mixture thus formed is heated above the vitreous transition temperature (Tg) of the polymer. The non centrosymmetric orientation is obtained by means of a DC electric field. It is then "frozen" in the vitreous state by cooling the whole under an electric field. In such a procedure, the molecules which are active in generating the second harmonic are placed parallel to the side chains of the polymer, these latter being oriented parallel to the electric field.

In the article mentioned, it is a copolymer which was used as orientating matrix (or host), the DANS being used as a compound capable of generating the second harmonic. The material obtained has a susceptibility of the second order $\chi(2)$ of $6 \times 10^{-9}$ esu (electrostatic unity) using an electric field of 0.6 V/$\mu$.

The major drawback of this material comes from its method of manufacture. The low solubility of the molecules capable of generating the second harmonic in the mesomorphic polymers leads to low intensities of the wave at pulsation $2\omega$.

To overcome these drawbacks, the invention proposes increasing the efficiency of the material by fixing, by means of a covalent connection, the second harmonic generating entity and the mesogenus group on the same polymeric skeleton. This allows materials to be obtained with a high content of second harmonic generating functions.

SUMMARY OF THE INVENTION

The invention provides then a mesomorphic polymeric material whose structure includes a skeleton to which side chains are attached, the material resulting from the association of a first and a second monomer, each of the monomers having an element of said skeleton and a side chain characteristic of this monomer, characterized in that:

the skeleton is a polyacrylate, a polymethacrylate, a polychloroacrylate or a polysiloxane, the side chains are formed of an element specific to the monomers and a spacer allowing attachment thereof to the skeleton element;

the spacer is of the type —$(CH_2)_n$— with $2 \leq n \leq 15$ or —$(CH_2—CH_2—O)_n$— with $1 \leq n \leq 5$;

the element specific to the first monomer is a mesomorphogenic group having a positive dielectric anisotropy, the element specific to the second monomer is a group having the following structure: D-(non localized $\pi$ electron system)-A where D is an electron giving group and A an electron accepting group, this specific element being joined to the spacer by means of the group D.

BRIEF DESCRIPTION OF THE DRAWINGS

The invention will be better understood and other advantages will be clear from the following description and the accompanying drawings in which:

FIG. 1 shows the chemical formula of a copolymer used in the prior art for serving as matrix to molecules capable of generating the second harmonic of an electromagnetic wave, FIG. 2 shows the chemical formula of the compound of the prior art having a high molecular hyperpolarizability, FIG. 3 shows the structure of the polymeric material of the invention, FIG. 4 shows the chemical formula of a material of the invention FIG. 5 is a detail of the chemical formula of FIG. 4, FIG. 6 is a thermogram of the material of the invention whose formula is shown in FIG. 4, FIG. 7 shows a cell used for obtaining an oriented film, and FIG. 8 shows a plate supporting electrodes and forming part of the cell of FIG. 7.

DESCRIPTION OF THE PREFERRED EMBODIMENTS

The nematic copolymer used by Meredith, Van Dusen and Williams in the above mentioned review is shown in FIG. 1. The skeleton of this copolymer is polymethacrylate. In this copolymer serving as matrix, only 2% by weight of 4N dimethylamino-4'-nitrostilbene (DANS) can be dissolved whose chemical formula is shown in FIG. 2. This low solubility explains the low intensity of the wave at pulsation $2\omega$ which may be generated.

The polymeric material of the invention has the structure shown in FIG. 3. It is formed from two monomers 1 and 2 whose molar fractions are respectively 1-x and x. The polymeric material is formed then of a skeleton 3, each of the monomers 1 and 2 having a constituent element of this skeleton, and side chains. Monomer 1 includes a mesomorphogenic group 4 connected to the skeleton 3 by a spacer 5. Monomer 2 includes a group 6 having high hyperpolarizability and capable of generating the second harmonic of an electromagnetic wave. This group 6 is connected to the skeleton 3 by a spacer 7.

The copolymer of the invention must have the following properties. It must be amorphous at ambient temperature and have a vitreous transition temperature higher than the ambient temperature. It must have a single mesophase, preferably nematic since it is that which is the most readily oriented under the effect of an electric field. To satisfy these requirements, the constituent elements of the copolymer will be chosen in the following way. The skeleton 3 of the copolymer may be a polymethacrylate, a polyacrylate, a polychloroacrylate or a polysiloxane. The spacers 5 and 7 will be of the type —(CH$_2$)$_n$— with $2 \leq n \leq 15$ or —(CH$_2$—CH$_2$—O)$_n$— with $1 \leq n \leq 5$. It should be noted that the spacers 5 and 7 are not necessarily identical for the same copolymer. The structure of the mesomorphogenic group 4 will be such that this group will have a positive dielectric anisotropy so as to allow orientation of the side chains of the polymer parallel to the electric field. For this, one or more permanent dipoles will be introduced into the architecture of the mesomorphogenic group. They will be advantageously chosen from the following: —NO$_2$, —CN, F, Cl, Br, —CF$_3$ or alkoxy.

Group 6 active in the generation of the second harmonic will have the following chemical structure: D-(non localized π electron system)-A.

In this group, D designates as electron giving group and A an electron accepting group. D will be chosen preferably from the following chemical functions: secondary amines —NH—R (R designating an alkyl), tertiary amines —NR$_1$R$_2$ (R$_1$ and R$_2$ designating alkyls), an oxygen atom involved in an ether connection or a sulphur atom involved in a thioether connection. A may be chosen from the following chemical functions:

$$-NO_2, -NO, -CO, -\overset{O}{\underset{|}{C}}- \text{ or } R_3\overset{+}{N}-$$

(R$_3$ being an alkyl).

As for the non localized electron system, it may belong to one of the following chemical functions:

—(CH=CH)$_n$— with $1 \leq n \leq 5$

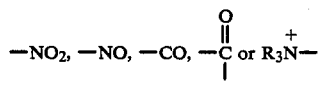  with $1 \leq n \leq 3$

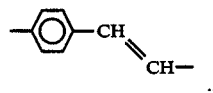

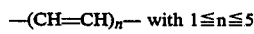 with $1 \leq n \leq 3$

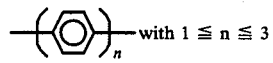

Elaboration of the mesomorphic polymeric material of the invention raises no particular problem for a man skilled in the art. Depending on the constituents of the material, different solutions are possible for its synthesis. In some cases, it is preferable first of all to polymerize the skeleton and then to attach the side chains thereto. In other cases, it is advantageous first of all to synthesize the monomers 1 and 2 and then to effect copolymerization thereof. Similarly, the other constituents (mesomorphogenic group 4, spacer 5 and 7, group 6 capable of generating the second harmonic) may be synthesized or attached in one or more times.

Some solutions may be mentioned by way of non limiting examples. For example, the mesomorphogenic group chosen is 4 hydroxy 4' cyanobiphenyl. If the skeleton is polysiloxane, it will be polymerized previously and the space will include a double link at the end of the chain allowing the hydrosilylation reaction to take place. In other skeleton cases where copolymerization of the monomers takes place last of all, the spacer will include the alcohol function at the end of the chain, which will allow subsequent esterification by means of chloride of an acrylic acid α- substituted or not. Another example is formed by the following mesomorphogenic group:

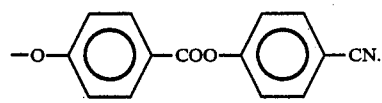

This group may be introduced in two stages. A first part of the mesomorphogenic group is grafted to the corresponding spacer. This assembly is then attached to the skeleton already polymerized (case of polysiloxane) or to an element of the skeleton (in the other cases). The second part of the mesomorphogenic group is then attached to its first part.

Generally, the group capable of generating the second harmonic is formed in one or two stages depending on the cases.

FIG. 4 shows the chemical structure of a mesomorphic polymeric material of the invention. The parameter 0.424 designates the molar strength in azoic monomer active in second harmonic generation. Its skeleton 3 is a polyacrylate. The spacers 5 and 7 are identical and are of the type (CH$_2$)$_n$ with n=6, Group 6 capable of generating the second harmonic is described is greater detail in FIG. 5. This copolymer has a single mesophase between the vitreous transition temperature Tg=32.7° C. and the clarification temperature Tc=127° C. as shown by the thermogram of FIG. 6. The axis of the ordinates of this diagram is graduated in the amounts of heat Q delivered per unit of time. (mcal/s). The axis of the abscissa plots the temperature T in degrees centigrade. This diagram was plotted during the temperature rise of a sample of a weight of 4.27 mg and for a heating rate of 10° C./min. The texture of this copolymer, observed by optical microscopy between crossed analyser and polariser is characteristic of a nematic mesophase.

So as to obtain an oriented film, this copolymer was melted on a glass plate 10 covered with a system of interdigitated electrodes 11 and 12 of the type shown in FIG. 8. These electrodes are transparent and made for example from a mixed tin and indium oxide. The spacing between two consecutive fingers is of the order of 80μ. The glass plate 10 covered with the copolymer is left for ten minutes or so at 150° C. on a bench of the Kofler type so as to allow degassing of the polymer then a second glass plate 15 is deposited on the molten polymer. FIG. 7 shows the cell used for obtaining an oriented film. We find again here, but seen in profile, the glass plate 10 supporting electrodes 11 and 12. Two spacers 13 and 14, made for example from a material such as "mylar" hold the plates 10 and 15 spaced apart by 130μ. The polymer 16 is then confined in the space defined by the plates and the spacers. The cell is then cooled to ambient temperature then sealed with a bonding agent of the "araldite" type. The orientation of the side chains of the polymer is obtained by applying a DC voltage of the order of 160 V to the terminals of electrodes 11 and 12, the cell being heated to a temperature of the order of 120° then cooled to ambient temperature while maintaining the voltage at the terminals of the electrodes.

If the oriented film is irradiated in the vitreous state by means of a laser ray of wavelength 1.06μ, the cell generates an electromagnetic wave of length 0.53μ. The non linear response coefficient obtained is $0.12 \times 10^{-6}$ esu, which corresponds to an intensity efficiency about 300 times greater than that of lithium niobate. This example clearly demonstrates the superiority of the material of the invention with respect to the above mentioned polymeric material whose non linear response coefficient is equal to $6 \times 10^{-9}$ esu.

The copolymers of the invention may find applications in numerous optoelectronic fields such as optical communications and integrated optics. In this latter field, the polymers have specific interest since they may be deposited on substrates of different kinds and so having different refraction indices.

What is claimed is:

1. In an optoelectronic article, the improvement comprising using a mesomorphic polymeric material whose structure includes a skeleton to which side chains are attached, the material resulting from the association of a first and a second monomer, each of the monomers possessing an element of said skeleton and a side chain characteristic of this monomer, wherein:

the skeleton is a polyacrylate, a polymethacrylate, a polychloroacrylate or a polysiloxane;

the side chains are formed of an element specific to the monomers and a spacer allowing attachment thereof to the skeleton element;

the spacer is of the type —$(CH_2)_n$— with $2 \leq n \leq 15$ or —$(CH_2—CH_2—O)_n$— with $1 \leq n \leq 5$;

the element specific to the first monomer is a mesomorphogenic group having a positive dielectric anisotropy;

the element specific to the second monomer is a group having the following structure: D-(delocalized π electron system)-A, where D is an electron donating group and A an electron accepting group, this specific element being joined to the spacer on the group D side.

2. The article of claim 1, wherein the mesomorphogenic group includes one or more dipoles of the following type: —$NO_2$, —CN, F, Cl, Br, —$CF_3$ or alkoxy.

3. The article of claim 1, wherein group D is one of the following chemical functions: a secondary amine —NH—R, a tertiary amine —$NR_1R_2$, an ion 0 involved in an ether linkage with the delocalized π electron system or an ion S involved in a thioether linkage with the delocalized π electron system, the radicals R, $R_1$ and $R_2$ being alkyls.

4. The article of claim 1, wherein group A is one of the following chemical functions: —$NO_2$, —NO, —CN, —CO— or $R_3N$—, the radical $R_3$ being an alkyl.

5. The article of claim 1, wherein the delocalized π electron system is one of the following systems:

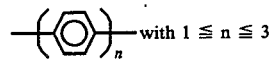 with $1 \leq n \leq 3$

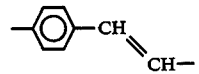

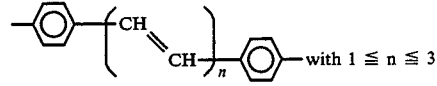 with $1 \leq n \leq 3$

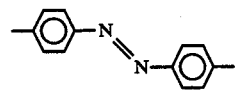

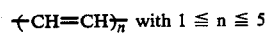 with $1 \leq n \leq 5$

6. The article of claim 5, wherein the skeleton is a polyacrylate, the spacer is —$(CH_2)_6$—, the mesomorphogenic group is

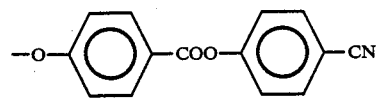

the group D is an oxygen ion, group A is the cyano function and the delocalized π electron system is the following system:

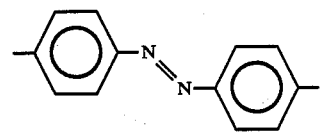

7. The article of claim 6, wherein the molar fractions of the first and second monomers in the copolymer are respectively 0.576 and 0.424.

8. The article of claim 1, wherein said mesomorphic polymeric material is amorphous at ambient temperature and has a vitreous transition temperature higher than ambient temperature.

9. The article of claim 1, wherein said mesomorphic polymeric material has a single mesophase.

10. The article of claim 9, wherein said single mesophase is nematic.

* * * * *